Feb. 19, 1924.
C. ANDREUCCI
FLYCATCHER
Filed June 6, 1922
1,484,369
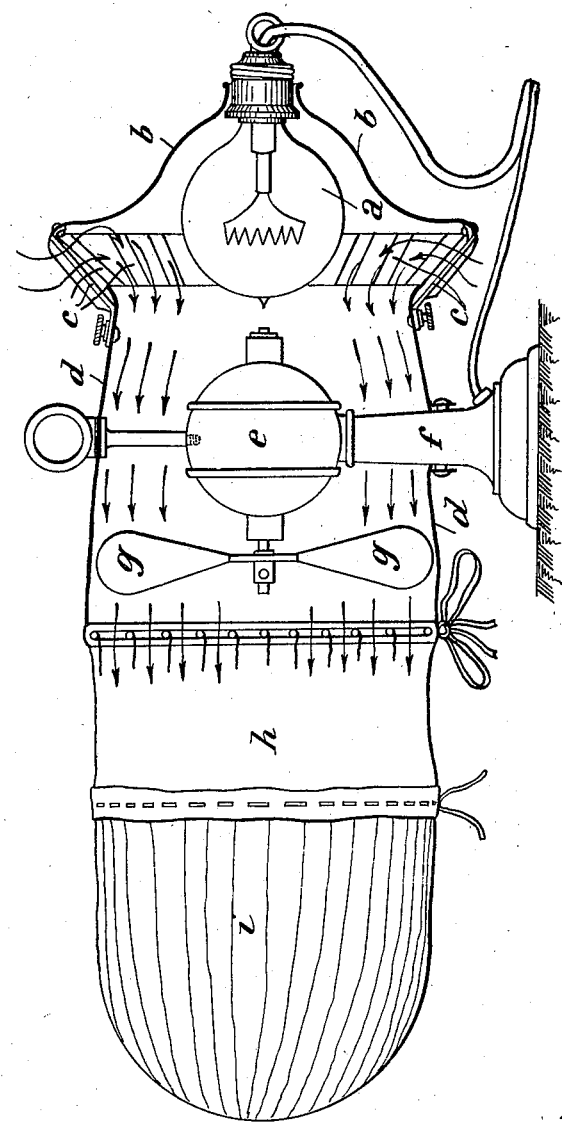
Inventor
C. Andreucci
By Marks&Clerk
Atty's Patented Feb. 19, 1924.

1,484,369

UNITED STATES PATENT OFFICE.

CARLO ANDREUCCI, OF ROME, ITALY.

FLYCATCHER.

Application filed June 6, 1922. Serial No. 566,289.

*To all whom it may concern:*

Be it known that I, CARLO ANDREUCCI, a subject of the King of Italy, and resident of Rome, Italy, have invented certain new and useful Improvements in Flycatchers, of which the following is a clear specification.

The object of the present invention is to provide a device for catching flies, gnats and other flying insects consisting chiefly in attracting the insects by an electric lamp or other light-giver and catching the same, in proximity to the lamp, by air suction generated by a fan in a dark chamber the insects being irresistably swept away into the dark chamber and thence into a gauze bag or other receptacle more or less permeable to air from which they may be removed from time to time.

In order that the invention may be better understood a form of the same is illustrated by way of example in the annexed drawing, where an electric glow-lamp has been chosen as light-giver this being convenient in order to be able to use one and the same source of power for lighting the lamp and operating the fan.

Referring now, more particularly, to the said drawing —a— designates an electric lamp, —b— a hat shaped shade preferably provided with lamp receiving socket and with a reflecting surface, connecting members —c— support the shade on one end of a dark chamber —d— preferably tapered at the mouth towards the lamp. In the said chamber —d— a fan —e— is mounted on a standard —f—, the latter serving as a main support for the entire device. The fan is provided with blades —g—, preferably dark colored, and operate so as to generate an air suction which in passing through a hose —h—, preferably of some tight fabric, whirls the insects into a bag —i— of a more or less air permeable nature, such as gauze or similar material.

The electric current for the lamp and fan may be taken in any suitable manner from a source of supply.

In operation the insects allured by the light of lamp —a— in attempting to reach the latter enter spaces or openings between the connecting members —c— where they are caught by the suction of an air current generated by fan —e— —f— —g— and carried away in the direction of the arrows through chamber —d— and hose —h— and hurled into bag —i— from which they may be removed from time to time.

Having now described my said invention and the manner in which the same is to be performed, what I claim is:

A device for catching flies and the like comprising a main stand, a cylindrical casing constituting a dark chamber carried by the stand, a fan mounted on the stand and having the blades thereof positioned within and near the rear end of the chamber, a hose connected to the rear end of the chamber, a receptacle of permeable material associated with the outer end of the hose, a shade having a reflecting surface on its interior, a lamp supported concentrically of and within the shade and a plurality of connecting links arranged in circular series about the forward edge of the dark chamber and the outer edge of the shade for connecting the shade in spaced relation to the chamber and being arranged in spaced relation with respect to each other so as to leave openings through which flying insects are drawn by the air suction generated by the fan and subsequently forced by the fan through the hose and into the receptacle.

CARLO ANDREUCCI.

Witnesses:
BORTOHIZZI TOMASSO,
DONATO PESSOTTA.